March 6, 1951 — J. E. MILLER — 2,544,100
APPARATUS FOR MEASURING DISTANCES WITHIN BORES
Filed Sept. 24, 1948
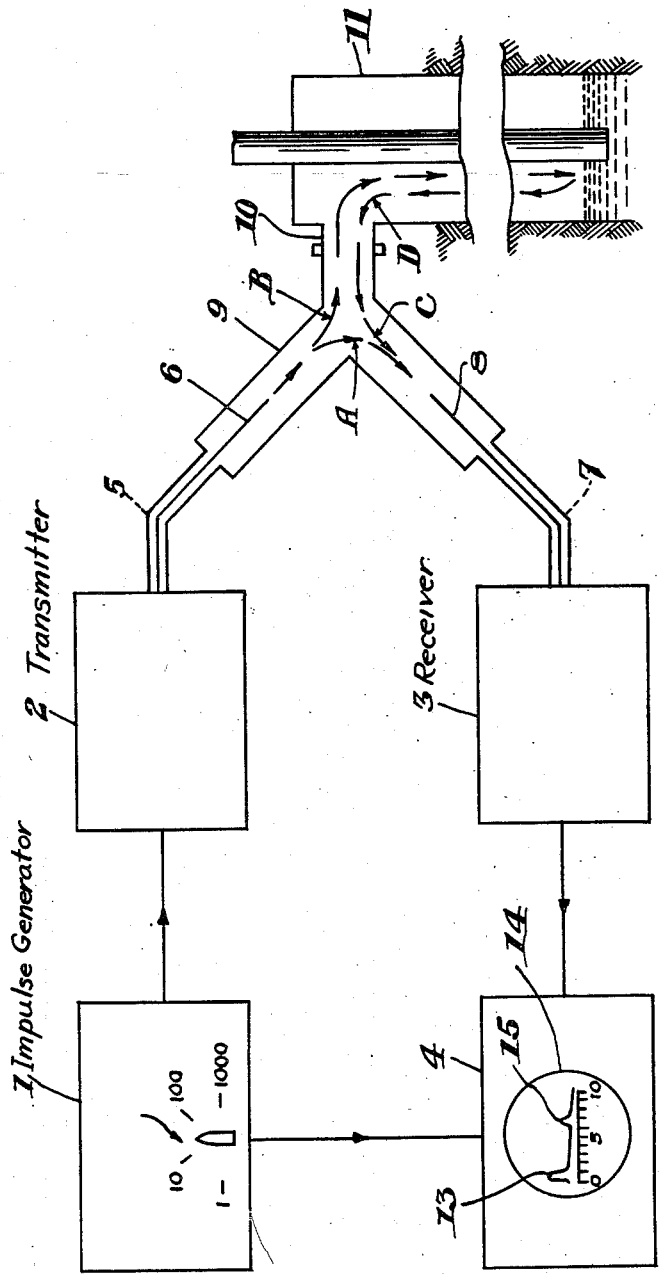
Inventor
John E. Miller
By Smart & Biggar
Attys.

Patented Mar. 6, 1951

2,544,100

UNITED STATES PATENT OFFICE 2,544,100

APPARATUS FOR MEASURING DISTANCES WITHIN BORES

John Evans Miller, Dallas, Tex.

Application September 24, 1948, Serial No. 51,081

2 Claims. (Cl. 343—13)

This invention relates to a method of measuring distance within bores such as oil wells, pipes and so forth.

Hitherto this has usually been done, particularly in oil wells, by means of sound echo apparatus: that is by producing a sound, and measuring the length of time between the issuance of the sound and the return of the echo from the surface of the liquid in the well. This method requires high power apparatus, and is subject to a number of inaccuracies, which are usually due to the difference in the speed of sound for varying temperatures and densities of the conducting medium.

It is well known that high frequency radio waves will behave to some extent like sound waves in that an echo will be produced as these cross the boundary between two media of different dielectric properties. Hence it has been found possible to measure the height of an aircraft above the ground or the depth of the ocean bed by the use of high frequency radio wave "echoes." This use of high frequency radio waves to measure distance has been known for some time as radar, and will hereinafter be referred to by that name.

It is further known that high frequency radio waves can be piped with very little loss through hollow conductors known as "wave guides." Physical dimensions of wave guides are proportioned to the operating wave length and, in the case of a rectangular wave guide, it is only necessary that the wave length be not more than 2 times the length of one side of the guide's cross section. In the case of a circular wave guide, the wave length must not be more than 1.73 times the minimum diameter of the guide. The high frequency energy is injected at one end, either through capacitive or inductive coupling or by radiation, and is received at the other end. The wave guide then merely confines the energy of the fields, which are propagated through it to the receiving end by means of reflections against its inner walls.

I have proposed to adapt a radar device to the measurement of distance within bores, and in accomplishing this object I have found that especially desirable results are obtainable by providing special wave guiding means, and by operating within certain frequency bands.

According to my invention in combination with a normal radar apparatus, which usually consists of high frequency impulse generating means, and transmitting means, receiving means and an oscilloscope, I provide a special type of wave guide which provides various wave paths as described below. By wave paths is meant courses which high frequency radiation will follow under the influence of wave guides.

The largest cross sectional dimension of the wave guide is preferably equal or smaller than the diameter of the smallest bore with which the apparatus may be used, and the wave length of the high frequency radiation must be less than twice this largest dimension. Thus, for example, in dealing with oil wells, the minimum diameter of the guide is preferably 2", necessitating a transmitter frequency of at least 3000 megacycles. Since the wave guide in this case will always have the smallest maximum cross sectional dimension of any met with by the high frequency waves in the bores, by using a wave guide according to my invention, the bore itself is used as a wave guide, and hence comparatively large distances may be measured with very little power loss, and transmitting means of comparatively low power may be used, and a corresponding saving of power costs and space is thus effected.

One embodiment of my invention is diagrammatically illustrated in the accompanying drawing, in which the various parts of a normal radar hook-up, that is, impulse generator transmitter, receiver and oscilloscope, are represented by characters 1, 2, 3 and 4 respectively. Since this combination is old and well known, no detail of the various circuits is given. Co-axial cable 5 leads from the transmitter 2 to a half-wave antenna 6, and a similar co-axial cable 7 leads from the receiving half-wave antenna 8 to the receiver 3.

A single wave guide 9 of tubular metal, and having three "legs," surrounds with separate legs both the sending aerial 6 and the receiving aerial 8. The third leg of the wave guide 9 is coupled to a suitable flange adapter 10 in a well-head 11. The diameter of the wave guide 9 is less than that of the well-head 11 or any other part of the well bore 12.

The wave guide 9 is designed, upon operation of the radar equipment, to cause high frequency radiation to travel in paths defined by the wave guiding means as follows: From the sending aerial 6 directly to receiving aerial 8 by path A.

From the sending aerial to the well-head by path B.

From the well-head to receiving aerial by path C.

Since the well diameter is greater than that of the wave guide 9, high frequency waves within the well will be guided down and up the well in some such path as D.

Any other shape than the Y shape shown which will provide wave paths as described is also suitable according to my invention.

By way of example, the operation of the device to measure the depth of a well is as follows:

The high frequency transmitter 2 has a frequency with a wave length equal to two times the minimum diameter of the well system, including the well-head wave guide 9. As this will probably be the smallest diameter encountered on any well, it may suitably be made of 2" extra strong pipe. The inside diameter of this 2" pipe would require a transmitter frequency of 3,000 megacycles in order for it or any other larger pipe section to act as a wave guide. It would be advantageous to use even a higher transmitter frequency in the order of 5,000 megacycles. The half wave antenna would be 2" long at 3,000 megacycles.

The pulses of energy from the transmitter 2 are controlled by the pulse generator 1, which also furnishes a time base on the horizontal plates of the oscilloscope 4. The pulse generator is a variable frequency oscillator to give a time base of from .002 microsecond (time interval for return of echo from one foot) to 30 microseconds (time interval for the return of echo from 15,000 feet). These time intervals would require an oscillator with frequency of 500 megacycles to 34 kilocycles.

The receiver 3 tuned to the transmitter frequency is attached to the receiving antenna 8 in the well-head wave guide 9, and the output of this receiver is connected to the vertical plates of the oscilloscope 4. At the instant of transmitter pulse a direct signal is received by the receiver 3, and a vertical "pip" 13 is recorded on the time base line of the oscilloscope screen 14. The pulse of energy travels down the casing or tubing 11, is reflected from the fluid surface or obstruction in the well, and is received some microseconds later by the receiver 3, and is recorded on the oscilloscope 4 as another "pip" 15 at a distance from the direct "pip" proportional to the time (and distance) for the pulse to be reflected. The time base is scaled to units of 10, and it is only necessary to multiply this reading by the "distance multiplier" 16 on the pulse generator 1 to obtain the distance to the fluid level or obstruction.

On account of the entire well system acting as a wave guide, the transmitter pulse would reach the fluid level with little or no loss, and the reflected wave would return to the receiver with little loss. This would permit the use of simple, low power transmitter and receiver, which in turn results in a small portable device.

The proposed device does not necessarily have to follow the exact system described. The pulse frequency may be generated by any electrical method and the transmitter may be frequency modulated.

This device will give distance readings of any fluid of different electrical characteristics and will determine two fluid levels simultaneously, for instance, the surface between the gas and oil and between the oil and water, if present in the hole. A pulse of sufficient energy will also locate the bottom of the hole through any fluids of an electrical characteristic differing from the actual formation in the bottom of the hole, providing the hole is cased or tubed to bottom. If the hole is not cased or tubed to bottom, the lowest part of the casing will be detected.

A photographic recording apparatus could be attached to give a continuous graphical record of change in fluid level without any attention on the part of the operator.

I claim:

1. Apparatus for measuring the distance from a point within a circular bore to a termination of the bore consisting of a reflecting surface for radio frequency radiation, said apparatus comprising transmitting means for generating pulses of radio frequency radiation of a wave length which may be set to less than 1.73 times the minimum diameter of the bore at its most restricted point, receiving means for said pulses, a substantially tubular wave guide providing a wave path from the transmitter to the bore and back from the bore to the receiver and providing a wave path from the transmitter substantially directly to the receiver, and means for indicating the difference in the time taken for the radiation to follow each said path.

2. Apparatus as defined in claim 1 in which the wave guide is substantially Y-shaped and has a smaller diameter than the bore.

JOHN EVANS MILLER.

REFERENCES CITED

The following references are of record in the file of this patent:

UNITED STATES PATENTS

| Number | Name | Date |
|---|---|---|
| 2,077,707 | Melton | Apr. 20, 1937 |
| 2,280,226 | Firestone | Apr. 21, 1942 |
| 2,281,274 | Dallenbach et al. | Apr. 28, 1942 |
| 2,310,559 | Walker | Feb. 9, 1943 |
| 2,345,932 | Gould | Apr. 4, 1944 |
| 2,364,371 | Katzin | Dec. 5, 1944 |
| 2,400,309 | Kock | May 14, 1946 |
| 2,401,717 | Wolff et al. | June 4, 1946 |